Patented June 15, 1926.

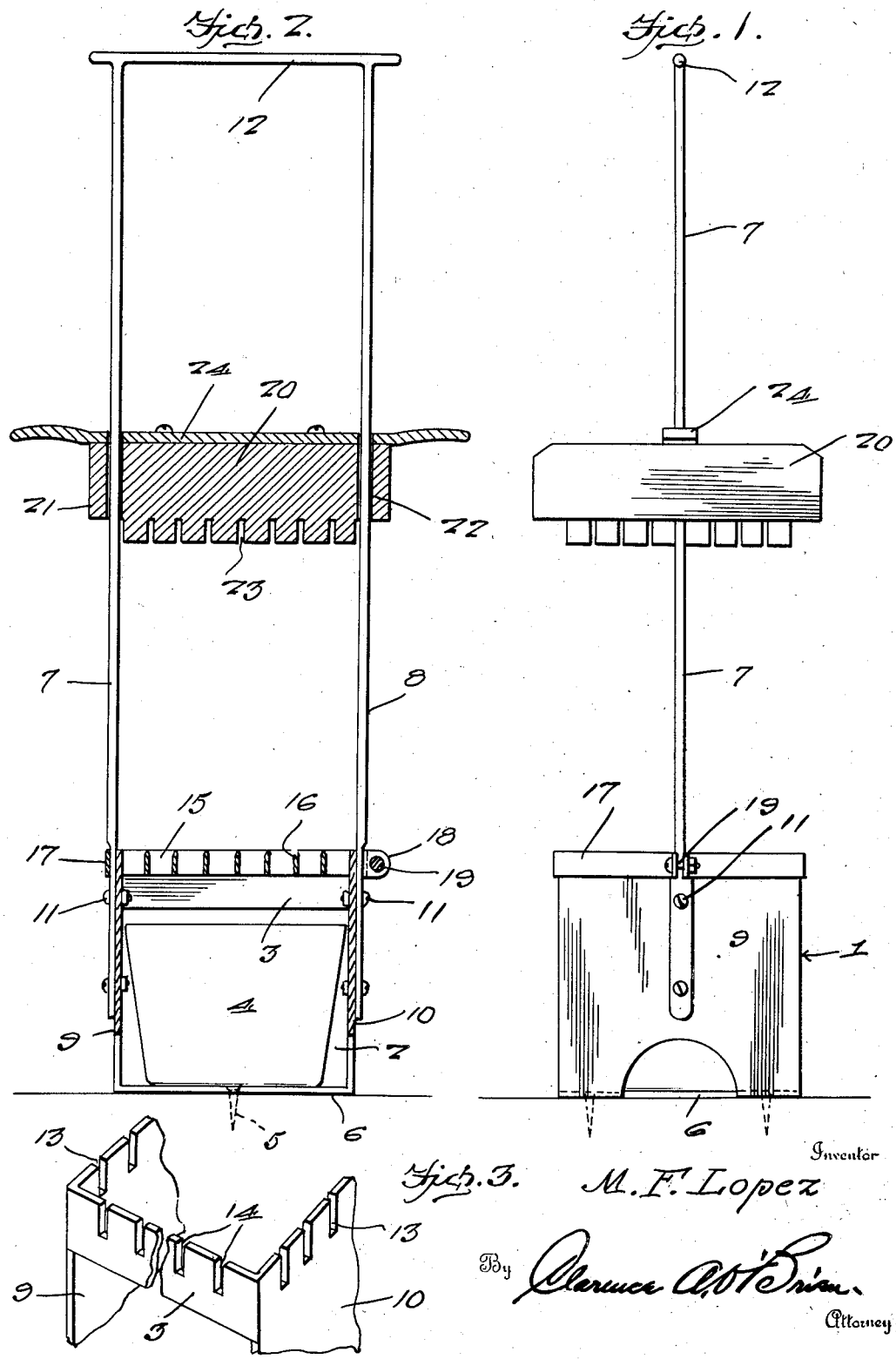

1,588,479

UNITED STATES PATENT OFFICE.

MANUEL F. LOPEZ, OF PHOENIX, ARIZONA.

VEGETABLE AND FRUIT CUTTER.

Application filed August 18, 1925. Serial No. 50,980.

This invention relates to improvements in vegetable and fruit cutters, and is more particularly adapted to an improvement over my copending application filed March 31, 1925, and bearing Serial No. 19,634.

One of the important objects of the present invention is to provide a device of the above mentioned character which will save considerable time and labor in cutting fruits and vegetables into small particles or slices, and without any danger of the person using the device cutting their fingers.

A further object is to provide a device of the above mentioned character wherein the parts are so constructed as to permit the same to be readily assembled or disassembled for cleaning purposes, and which furthermore will at all times be positive and efficient for the purpose for which it is designed.

A further object is to provide a device of the above mentioned character which is simple in construction, inexpensive, strong, and durable and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the same:

Figure 1 is a side elevation of my improved vegetable and fruit cutter.

Figure 2 is a vertical sectional view therethrough, and

Figure 3 is a fragmentary detail perspective of the frame.

In the drawing, wherein for the purpose of illustration is shown the preferred embodiment of my invention, the numeral 1 designates generally the frame, the same being substantially rectangular in design and having its top open. One pair of opposed sides of the rectangular shaped frame is formed of sheet metal, and is cut away for its major portion as indicated at 2 whereby the horizontally extending strips 3 are formed. The purpose of this construction is to provide a means whereby a receptacle or the like, shown at 4, may be placed into or removed from the frame as will be hereinafter more fully described. The frame is adapted to be rigidly supported, and to this end, suitable fastening means illustrated at 5 extend through the bottom 6 of the frame into the object on which the frame is to be supported.

A pair of elongated rods 7 and 8 are secured at their lower ends to the intermediate portions of the opposed sides 9 and 10 respectively of the frame 1 as illustrated at 11. The lower portions of these rods are flattened to facilitate the securing of the same to the aforementioned sides of the frame. These rods extend upwardly from the frame for a suitable distance, and are bridged at their upper ends by the cross bar 12, whereby the rods are maintained in parallel spaced relation with respect to each other.

Formed in the upper edges of the sides 9 and 10 of the frame 1 are the aligning notches 13, the same being arranged at spaced intervals and disposed in vertical spaced relation with respect to each other. Each of the strips 3 which extends between the upper portions of the sides 9 and 10 is also provided with a series of vertically disposed parallel spaced notches at the upper edge thereof as indicated at 14. The aligning notches 13 are adapted to receive the respective ends of the longitudinally extending knives or cutter blades 15, while the aligning notches 14 formed in the upper edges of the strips 3 receive the respective ends of the transversely extending knives or cutter blades 16. These knives are disposed at substantially right angles to each other, as is obvious from the construction shown in the drawing, and the upper edges of each of the knives or blades are sharpened as clearly illustrated in Figure 2.

For the purpose of retaining the knives in their proper positions in the open top of the frame, there is provided a locking band 17, the same extending around the upper portion of the sides of the frame 1, and particularly around the ends of the knives or cutter blades which are disposed in the respective notches provided therefor in the upper edges of the sides of the frame. The free ends of the locking band 17 are disposed laterally, as indicated at 18 and a suitable locking bolt 19 extends transversely through these laterally extending free ends whereby the locking band is held in proper position on the frame. The inner side of the locking band will engage the outer faces of the respective sides of the frame, it being understood of course that the frame is of such material as to permit the same to readily bend to conform to the shape of the frame so as to fit snugly against the respective sides of the frame, and there will be no possibility of the knives working loose, and becoming disengaged from their respective notches in the frame.

Adapted for vertical slidable movement on the parallel spaced rods 7 and 8 is the substantially rectangular shape block 20. Vertically arranged openings 21 and 22 are formed in the intermediate portion of the block adjacent the respective sides thereof for cooperation with the rods 7 and 8 respectively, as is shown in Figure 2. The block has its bottom portion provided with the transversely extending slots 23 which are adapted for cooperation with the transversely extending knives or cutter blades 16, and a similar series of slots extending longitudinally in the bottom of the block for cooperation with the longitudinally extending knives or cutter blades 15. These slots are obviously disposed at substantially right angles to each other in the same manner as are the blades, or knives.

The handle bar 24 is secured on the top of the block 20, and the ends of the handle bar extend beyond the sides of the block to facilitate the grasping of the same, and as is shown in Figure 2, this handle bar is also provided with suitable openings which register with the openings 21 and 22 formed in the block for receiving the rods 7 and 8.

In use, the parts are arranged as shown in the drawing and the vegetable or fruit to be cut into small pieces is placed on top of the cutting blades or knives 15 and 16. The handle bar 24 is then grasped and the blocks 20 is moved downwardly on the rods 7 and 8. As soon as the bottom of the block engages the vegetable or fruit which rests on the cutting edges of the knives, and the further downward movement of the block is made, the fruit or vegetable will be forced downward by the block through the faces provided by the intersecting knives so that the material will be cut up into small particles, and such particles or slices will drop into the receptacle 4 which has been placed in the frame through the open side thereof, and is disposed below the cutting knives. When the cutting edges of the knives have entered their respective slots provided therefor in the bottom of the block 20, the vegetable or fruit will have been entirely cut up into small particles or slices, and all the particles will have been ejected from between the blades.

By removing the locking band 17, any number of knives of either the longitudinally or transversely extending series may be removed from their respective edges to permit the material to be cut into larger or smaller pieces, as may be desired. The simplicity in which my device is constructed enables the same to be readily assembled or disassembled for cleaning purposes, and there will be no danger of a person cutting their fingers when using the device.

While I have shown the preferred embodiment of my invention it is to be understood that minor changes in the size, shape, and arrangement of parts may be resorted to without departing from the spirit of the invention and the scope of the appended claims.

Having thus described the invention, what I claim is:—

1. A device of the class described comprising a stationary frame having its top open, a pair of rods extending upwardly from the opposed sides of the frame, a cross member associated with the upper ends of the rods for holding the same in parallel spaced relation, a series of knives arranged in the open top of the frame, a block adapted for vertical slidable movement on said rods, said block having slots formed in the bottom thereof for cooperation with said knives for cutting material placed on the knives into small particles, and forcing the same downwardly between the knives.

2. A device of the class described comprising a stationary frame having its top open, said frame being of substantially rectangular design, a pair of elongated rods secured at their lower ends to one pair of opposed sides of the rectangular shaped frame and extending upwardly therefrom, a cross bar bridging the upper ends of the rods for holding the same in parallel spaced relation, the upper edges of the opposed sides of the frame being provided with aligning notches, a series of knives arranged longitudinally and transversely in the top of the frame and having their ends supported in the respective aligning notches whereby the knives are supported in a horizontal position, means for preventing the displacement of the ends of the knives from the respective notches, said means comprising a band extending around the sides of the upper end portion of the frame adjacent the ends of the knives, the free ends of the band being disposed laterally and secured together, a block adapted for vertical slidable movement on said rods, said block having its bottom provided with slots for cooperation with the respective knives.

3. A device of the class described comprising a stationary frame having its top open, a pair of rods extending upwardly from the opposed sides of the frame, a cross member associated with the upper ends of the rods for holding the same in parallel spaced relation, a series of knives arranged horizontally in the open top of the frame, a block provided with a pair of vertical openings through which said rods extend whereby the block is adapted for vertical slidable movement on the rods, a handle bar associated with the block, the block being provided with slots in the bottom thereof for cooperation with said knives for cutting material placed on the knives into small particles, and forcing the same downwardly between the knives when said block is moved downwardly on the knives.

In testimony whereof I affix my signature.

MANUEL F. LOPEZ.